UNITED STATES PATENT OFFICE.

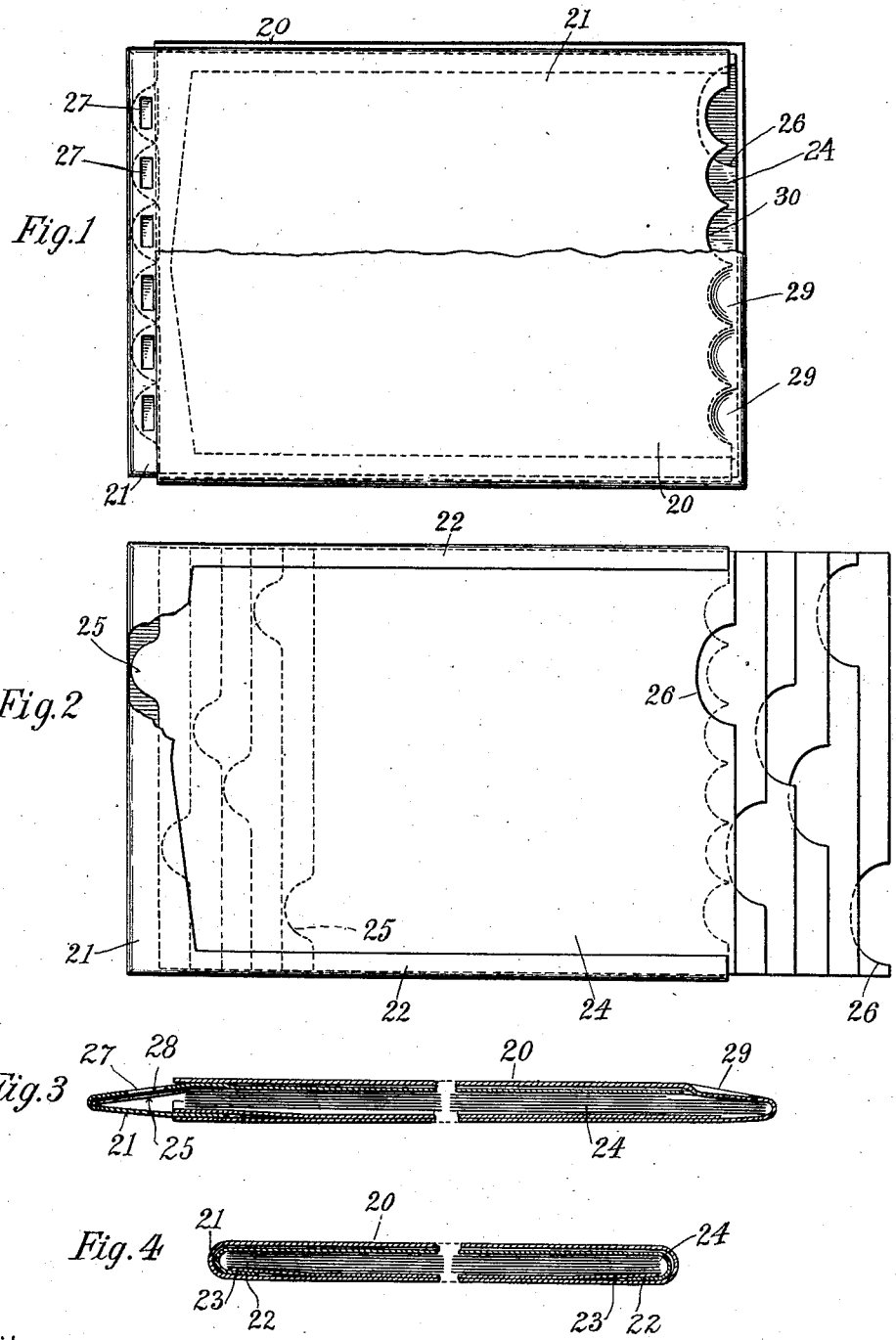

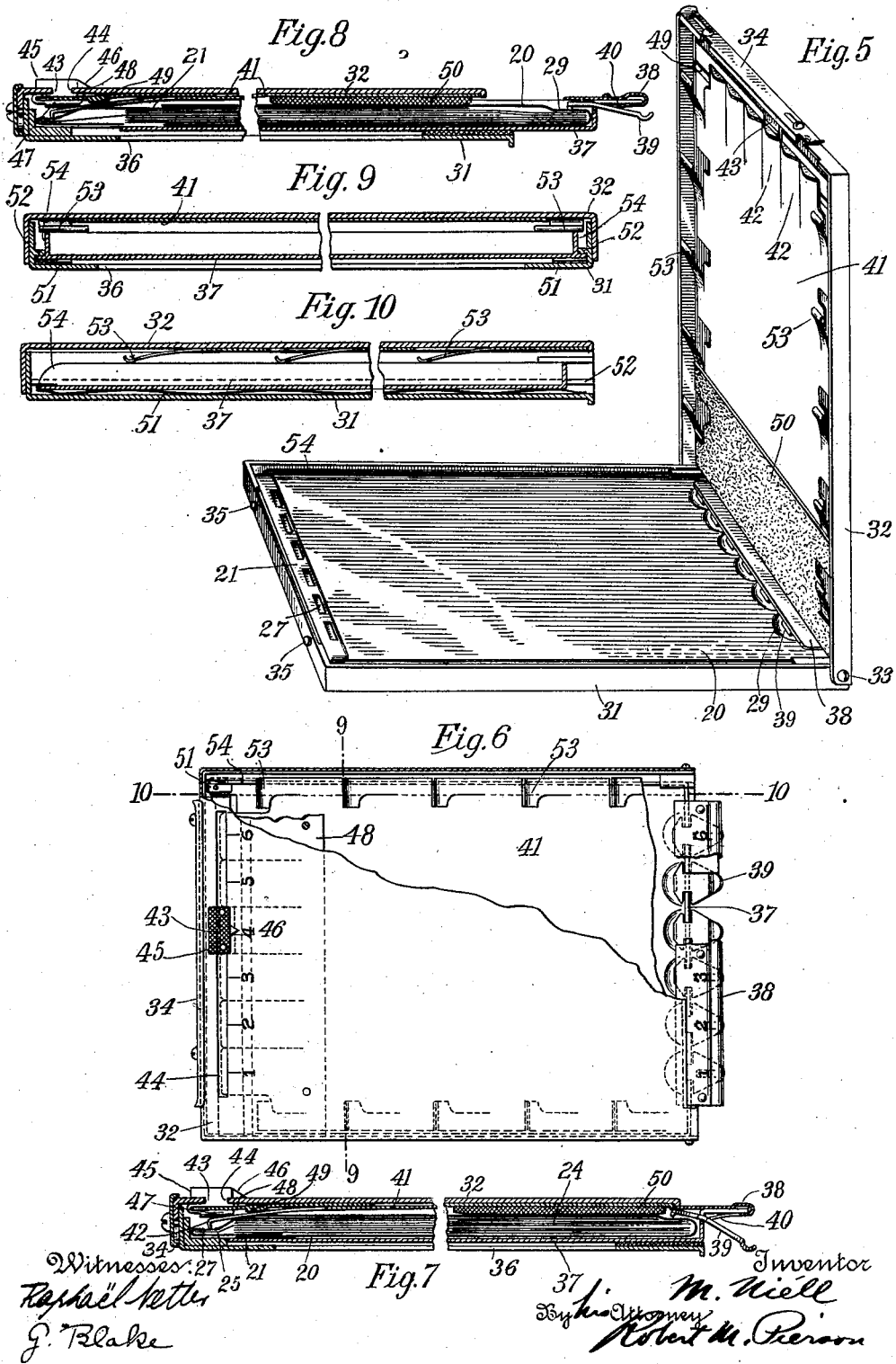

MAGNUS NIÉLL, OF NEW YORK, N. Y.

PHOTOGRAPHIC-FILM PACKAGE AND HOLDER THEREFOR.

No. 900,194.  Specification of Letters Patent.  Patented Oct. 6, 1908.

Application filed June 18, 1907. Serial No. 379,648.

*To all whom it may concern:*

Be it known that I, MAGNUS NIÉLL, a subject of the King of Sweden, residing at New York, in the county of New York and State of New York, have invented certain new and useful Improvements in Photographic-Film Packages and Holders Therefor, of which the following is a specification.

This invention relates to a package for holding a number of photographic films in a flat state in such a manner that any selected film may be exposed, and it further relates to a holder adapted to contain a film package of this character and expose the selected film.

Heretofore it has been customary to supply film packages containing a number of flat films with black paper interposed between the individual films and to manipulate the package so as to withdraw all of the exposed films lying adjacent to the exposure opening, making the exposure on the topmost film of those remaining in place. The use of opaque paper sheets between films is objectionable on account of its expense, the increased thickness of film package necessitated, and the slow chemical effect of the paper on the films.

To dispense with the use of paper sheets between the films is the principal object of my present invention and I have embodied in the packet and holder herewith illustrated the idea of withdrawing all of the films excepting the one to be exposed, which latter remains in the frame or body-part of the package while the other films are held in an envelop part and protected thereby from access of light, the end edge of the stationary or exposing film remaining in its place overlapping the withdrawn films so that when the envelop is pushed back to close the packet the exposed film slides properly into place with respect to the rest of the films.

Of the accompanying drawings, Figure 1 represents a plan view partly broken away, showing the rear side of the film packet. Fig. 2 represents a front view of the frame or body-part of the packet, partly broken away, showing the films withdrawn different distances as they might appear when being packed at the factory though not as actually operated to make exposures. Fig. 3 represents a longitudinal section of the package in closed condition. Fig. 4 represents a transverse section thereof. Fig. 5 represents a perspective view of my improved film-packet holder opened out and with the packet in place. Fig. 6 represents a rear view of the holder partly broken away. Fig. 7 represents a longitudinal section of the holder with the packet in place and the holder-slide undrawn. Fig. 8 represents a similar view with the slide partly drawn. Fig. 9 represents a transverse section on the line 9—9 of Fig. 6. Fig. 10 represents a longitudinal section on the line 10—10 of Fig. 6.

The thickness of the holder and film package has been considerably exaggerated for the sake of clear illustration.

Referring first to the views on Sheet 1, showing the film package, the latter is seen to consist of an outer envelop-part 20 of rectangular form which is the part withdrawn when a film is exposed, and an inner frame or body 21 which is the part remaining in place in the camera at that time. These are both preferably made of heavy paper and designed to be thrown away after use. The frame 21 telescopes within the envelop 20 and is closed only on one side, its front side being open as shown in Fig. 2, and having side edge strips or portions 22 of its wall overlapping the edges of a lining-piece 23 (Fig. 4) permanently fixed within the envelop 20 so as to avoid the entrance of light endwise into the envelop when the latter is closed.

24 are the flat films here shown as six in number, and each film has at one end a tab 25 and at the opposite end, in line with this tab, a recess 26, the said tabs and recesses being capable of formation by stamping out the films. The position of each tab and recess on any film in the package is different from the position of the tab and recess for every other film so that the tabs and recesses are not alined in different films but together they extend in a row along the end edges of the stack of films.

The tab ends of the films slip into the pocket formed by the left-hand end of the frame-part 21, as viewed in Figs. 1, 2, and 3, this pocket being made of the same relatively stiff paper as the rest of said body-part, and on the rear or closed side of said body-part near its left-hand edge are formed a number of openings 27, one opposite each tab and covered on the inside by a strip of more flexible paper or other material 28 (Fig. 3). By pinching the appropriate tab through one of these openings 27, with the thumb-nail for example or an equivalent mechanical member, any selected film may be caused to remain stationary in the body-part 21 while the remaining films are withdrawn with the envelop.

At the closed end of the envelop 20 where the recessed ends of the films are bottomed, its rear wall is molded with a series of depressions 29 opposite the respective film recesses 26 and the free edge of the body-portion 21 is scalloped at 30 to avoid these depressions.

In operating the film package by hand the film selected for exposure would be held in the body-part 21 of the package by pinching its tab 25 through the appropriate opening 27. At the same time the envelop 20 may be drawn off until it nearly leaves the body-part 21 and will carry with it all but the one film whose tab is held, by pinching the edge of the envelop through that depression 29 which is in line with the pinched tab, that is, in line with the opening 27 wherein the operator has his thumb-nail. The film whose tab 25 is held has its recess 26 in the same line so that pressure exerted through the package at the proper depression 29 holds all of the films but this one.

The package may be restored to its normal closed form by sliding the envelop 20 back on the body 21, whereupon the films which have been withdrawn with the envelop will re-register with the exposed film and the latter retain its original order in the pack, its recessed edge not having at any time lost overlap with the remainder of the pack.

From the above it will be seen that my improved film package is a complete article in itself and capable of selective operation in a camera by merely using the operator's fingers. The package would of course be mounted in a suitable holder at the back of the camera. For more conveniently manipulating the film package however it is desirable to provide a special form of holder constructed with reference to its use on my novel film package. Such a holder I will now describe, the two articles constituting related parts of my invention and mutually contributing to its objects.

The holder is represented in Figs. 5 to 10 inclusive, on Sheet 2 of the drawings. 31, 32 are the two halves or leaves of the holder, hinged together at 33, having overlapping sides so that when brought together the two leaves form a closed shallow box of rectangular shape and of sufficient size to contain the film package 20, 21. Along the non-hinged edge of the leaf 32 is mounted a sliding catch-plate 34 adapted to engage suitable pins 35 on the edge of the leaf 31. Leaf 31 has a rectangular exposure-opening 36 (indicated in Figs. 8 and 9) and a withdrawable slide 37 normally covering this opening. The slide has a projecting ledge or rabbet 38 on the rear face of which are stamped numerals "1", "2", "3", etc., corresponding in position to the tabs and recesses of the films, and under each numeral there is pivoted a short finger-lever 39 having a spring 40 (Figs. 7 and 8) to normally elevate its inner end and depress its outer end as shown in Fig. 7. The inner ends of these levers register with the depressions 29 of the film envelop 20 and are adapted, when the outer end of any one of them is pressed toward the rabbet 38 as indicated in Fig. 8, to pinch and hold all of the films except the one selected for exposure, which, as before stated, will be omitted by reason of its recess 26.

Within the leaf 32 is mounted a plate 41 formed with a series of spring fingers 42, and when the holder is closed the in-turned ends of these fingers register with respective openings 27 in the body-part of the film package. Any one of the spring fingers may be selected and depressed by the action of a slide 43 running in a slot 44 on the leaf 32. On the outside of the holder this slide has a thumb-piece 45 for moving it and a pointer 46 coöperating with numerals "1", "2", "3", etc. marked on the holder. Inside of the holder the slide has a cam 47 for engaging and depressing the spring fingers 42. A fixed plate 48 with a ridge 49 extends across the back of the fingers for holding them slightly away from the wall of the holder in position for engagement by cam 47. This plate occupies a cleft in the slide 43 and covers slot 44 so as to avoid entrance of light. A strip of velvet 50 is attached to plate 41 near the opening through which slide 37 operates, with the purpose of preventing light from entering around the edges of the envelop 20 when said slide is drawn.

For keeping in the focal plane the exposure side of the film package, I show two waved spring strips 51 mounted under the flanges 52 (Fig. 9) on leaf 31 which engage the edges of the slide 37, and along each longitudinal edge of the plate 41 is a series of spring tongues 53 adapted to coöperate with the spring-strips 51. The spring-strips and tongues hold the longitudinal edges of the film package between them with the exposed film in the proper focal plane at about the locality of the flanges 52, and when the slide 37 is pushed in, its side flanges 54 elevate the ends of the spring-tongues 53 and prevent the latter from exerting friction on the envelop 20 until said envelop has been drawn out past the tongues.

To insert the film package in the holder the latter is opened as shown in Fig. 5 and the package inserted with the closed end of its envelop 20 under the finger-levers 39, each finger-lever occupying a depression 29. Being then closed and locked with the catch-plate 34, the holder may be inserted like an ordinary plate-holder in a camera. In making an exposure the cam-slide 43 is moved opposite to one of the numerals along its path (the progression being preferably in numerical order so that the cam-slide may act as an index of the number of exposures which have been made). The corresponding spring-finger 42 is thus depressed and the tab 25 of the film thus selected is pinched through one of the openings 27. Then the operator pulls the slide 37 with his finger on that one of the levers 39 which is in line with the position of cam-slide 43, thus pinching all of the films in the envelop 20 except the one whose tab 25 is held by the cam-slide. This film is missed by reason of its recess 26, and remaining stationary it becomes exposed to the interior of the camera through the opening 36 in the plate holder and the opening in the film-package body 21 (see Fig. 2) when the envelop 22 is drawn out with slide 37. It will thus be seen that the only film which remains stationary when the holder-slide and the package envelop are withdrawn is the film intended for exposure. The other films are drawn out in the envelop and are slipped back in register with the exposed film when the holder-slide is returned. Thus I avoid the use of opaque paper between the films. An incidental advantage is that any single film may be taken out for development without disturbing the others, this being done in the dark-room by going through the exposure operation with the film package alone, and taking out the single film held in the body 21 when envelop 20 is withdrawn with the other films.

I regard the individual films made with tabs and recesses in the manner described and also the stack of films having their tabs and recesses related in the peculiar manner set forth, as constituting in themselves novel elements of my invention, and I also contemplate the possibility of using the holder and film-stack in combination without the package, or without the slide, the slide of the holder in the former case being made suitably light-tight, and the envelop in the second place taking the place of the holder slide, all as will be evident to a mechanic without special illustration. I also regard the film package as a novel element as before indicated.

I claim:

1. A photographic film package comprising an envelop, a body telescoping therein and open at the front, and a stack of films having means for selective engagement of any individual film through the wall of said body, and means for selective engagement of the remaining films through the wall of the envelop.

2. A stack of flexible photographic films for a film package, having differently-positioned individual tabs along one edge of the stack, and differently-positioned individual recesses along the opposite edge.

3. A flexible photographic film having a tab on one edge, and a recess in longitudinal alinement with said tab on the opposite edge.

4. A stack of flexible photographic films, each having a tab on one edge and a longitudinally-alined recess on the opposite edge, the tab and recess on each film having a lateral position differing for the several films.

5. A stack of films having differently-positioned individual tabs along one edge and differently-positioned individual recesses along the opposite edge, in combination with a container composed of an open-front body having a row of suitably-marked gripping places through which to engage the respective tabs and hold any individual film, and an envelop telescoping on said body and having a row of suitably-marked gripping places through which to engage the remaining films.

6. A photographic film-holder composed of a casing and a slide, each having a row of film-engaging devices, the two rows being at opposite edges of the holder.

7. A photographic film-holder composed of a casing having two leaves hinged together, a series of selective film-engaging devices mounted on one of the leaves, an exposing slide movable on the other leaf, and a second series of selective film-engaging devices mounted on said slide.

8. A photographic film-holder composed of a casing and a slide, a row of spring fingers on one of said parts, and a cam mounted to slide longitudinally of said row for actuating the individual fingers.

9. A photographic film-holder composed of a casing and a slide, and a row of finger-levers on one of said parts for selectively engaging films adapted to be contained in the holder.

10. A photographic film-holder composed of a casing and a slide, a series of film-engaging devices on one of said parts, and a movable member for actuating the individual devices, having an externally-exposed pointer.

11. A photographic film-holder comprising a casing having a row of film-engaging devices, means for selectively actuating said devices to hold any one of a stack of films, an exposing slide mounted on said casing, and a series of finger members mounted on said slide for engaging and withdrawing the remaining films of the stack.

12. A photographic film-holder comprising a casing made in two parts adapted to be opened for loading and unloading, a row of film-engaging devices mounted along one end of said casing, a slide withdrawable through the opposite end of the casing, and a second row of film-engaging devices mounted along the outer edge of said slide.

13. A photographic film-holder comprising a casing made in two leaves hinged together at one end, a slide mounted on one of the leaves and withdrawable through that end of the casing, a row of film-engaging finger-levers mounted on the outer edge of the slide, a row of film-engaging spring fingers at the opposite end of the casing mounted on the other leaf, and a sliding cam movable along said row of spring-fingers for depressing any individual finger.

14. A photographic film-holder composed of a casing of flat form adapted to hold a stack of films, an exposing slide mounted on said casing, devices on the casing and slide for selectively holding any individual film and withdrawing the rest with the slide, and resilient means on the casing for maintaining the individual film in the focal plane of the holder.

15. A photographic film-holder composed of a casing having an exposure-opening and one or more springs adjacent said opening for positioning a film during exposure, an exposing-slide mounted on said casing and adapted to lift said springs when pushed inwardly, and devices on said casing and slide for selectively engaging the films.

16. A photographic film-holder composed of a flat casing having an exposure-opening, an exposing-slide mounted on said casing, devices on the casing and slide for selectively engaging the films, and two rows of springs located in the casing along the sides of its exposure-opening for engaging the edges of a film-package, said springs being located in the path of the slide and lifted by said slide when the latter is pushed inwardly.

17. A photographic film-holder composed of a casing having an exposure-opening, a slide to cover said opening, devices on said casing and slide for selectively engaging the films, and a pair of waved spring strips disposed along the sides of the exposure-opening for positioning the selected film during exposure.

18. A photographic film-holder composed of a casing made with two leaves hinged together, a slide on one of the leaves, devices on said casing and slide for selectively engaging the films, and two sets of coöperating springs, one on each leaf of the casing, for positioning the selected film during exposure.

19. A photographic film-holder composed of a casing having an exposure-opening, a slide to cover said opening, a row of film-engaging devices mounted on said slide, and an inner plate formed with a row of film-engaging spring fingers on the edge opposite said devices, and with two rows of springs ranged along opposite sides of said exposure-opening.

20. A film-package composed of an envelop and a body telescoping therein and having an open front, in combination with a holder comprising a casing having an exposure-opening, means on said casing for selectively engaging said body at a plurality of places along its outer edge, an exposing-slide to cover said opening, and means on said slide for selectively engaging the envelop at a plurality of places along its closed edge.

21. A stack of films having differently-located individual tabs forming a row along one edge of the stack and corresponding individual recesses along the opposite edge, in combination with a holder for the films composed of a casing having a row of devices for selectively holding the tabs, and a slide having a row of devices for selectively holding the recessed edges of the films.

22. A film package composed of a body and an envelop telescoping thereon, a stack of films with differently-located individual tabs in a row at the outer edge of the body and corresponding recesses in the closed end of the envelop, in combination with a holder comprising a casing having a row of gripping devices to engage the tabs through the wall of said body and a slide having a second row of gripping devices to engage the recessed edges of the films through the wall of the envelop.

23. A film package composed of two parts telescoping on each other and adapted to contain the films, in combination with a holder comprising a casing and a slide having devices for gripping the respective parts, and resilient means on the casing adapted to engage the package to position the films during exposure, said means being actuated by the movement of the slide so as to relieve friction on that part of the package which is withdrawn with the slide.

In testimony whereof I have hereunto set my hand in the presence of two subscribing witnesses, the eleventh day of June, 1907.

MAGNUS NIÉLL.

Witnesses:
G. W. HOPKINS,
G. BLAKE.